Oct. 16, 1923.  
E. GRATT  
VEHICLE TIRE  
Filed April 8, 1920

1,470,726

WITNESSES  
A. E. Hyde  
O. L. Naal

INVENTOR.  
Emil Gratt  
By R. S. Caldwell  
ATTORNEY.

Patented Oct. 16, 1923.

1,470,726

UNITED STATES PATENT OFFICE.

EMIL GRATT, OF WATERTOWN, WISCONSIN, ASSIGNOR TO OSCAR C. WERTHEIMER, OF WATERTOWN, WISCONSIN.

VEHICLE TIRE.

Application filed April 8, 1920. Serial No. 372,178.

*To all whom it may concern:*

Be it known that I, EMIL GRATT, a subject of Budapest, Hungary, and a resident of Watertown, in the county of Jefferson and State of Wisconsin, have invented new and useful Improvements in Vehicle Tires, of which the following is a description, reference being had to the accompanying drawings, which are a part of this specification.

This invention has for its object to provide a vehicle tire of the type containing a sponge rubber tire filler or inner tire, the purpose being to avoid friction and consequent wear between the sponge rubber tire filler and the outer casing. Sponge rubber tire fillers have usually been provided with a fabric surface to fit against the fabric lining of the outer casing. The rubbing of the fabric surface causes friction and wear and is inclined to heat the tire. To avoid these conditions the present invention provides the fabric covering of the tire filler with a layer of solid rubber of material thickness incorporated therewith to form a smooth surface having less friction with the fabric lining of the casing.

With the above and other objects in view the invention consists in the vehicle tire as herein claimed and all equivalents.

Figure 1:
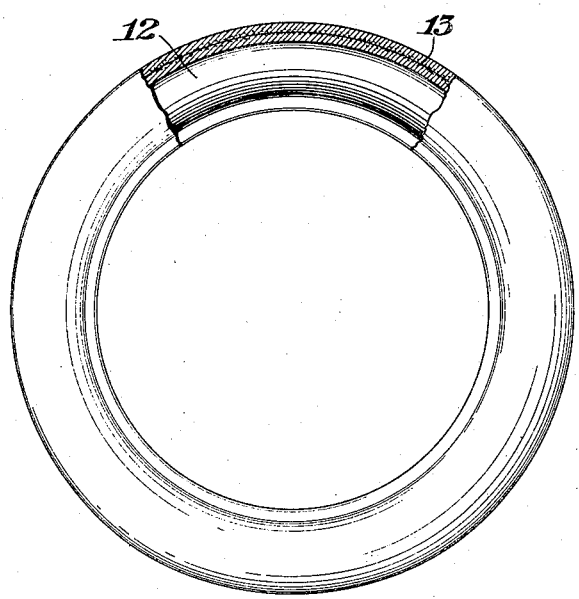
Figure 2:
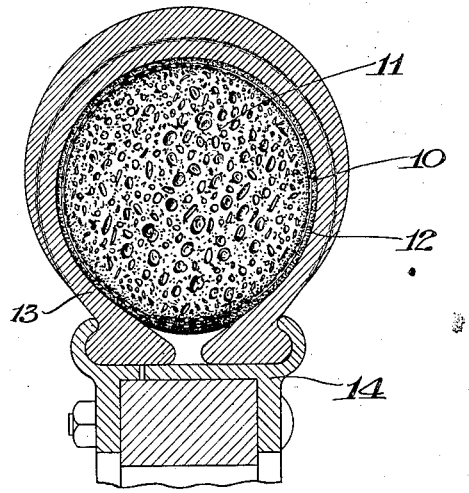

Referring to the accompanying drawings in which like characters of reference indicate the same parts in different views:

Fig. 1 is an elevation partly in section of a vehicle tire constructed in accordance with this invention; and Fig. 2 is an enlarged transverse section through the tire and its rim.

In these drawings the inner tire is shown to be of sponge rubber and is made in accordance with the Huebner Patents Nos. 1,103,359 and 1,260,384 except that a single fabric covering 10 surrounds the sponge rubber core 11 and is contained within an outer wall of solid rubber 12 of material thickness. The solid rubber 12 like the outer convolutions of the sheet rubber, which is rolled together to form the mass before vulcanizing, is not provided with the volatile ingredients that produce the cellular structure of the interior and consequently the rubber inside of and surrounding the fabric 10 is solid or free from the openings or cells that characterize the interior.

In order that the physical characteristics of the tire filler may be better understood the method of forming the cellular body may be briefly described. This is made from a rubber compound to which certain volatile and preservative ingredients have been added. The volatile ingredients in the rubber when heated under suitable conditions tend to expand and form a cellular structure the cells of which are filled with a gas medium, and the preservative ingredients maintain the moist condition of the rubber after vulcanization and insures its life for an indefinite period. This central portion or core whether it is made up of a cylindrical roll of the compound in sheet form or is molded from a common mass is surrounded by one or more convolutions of sheet rubber not containing the volatile ingredients and then with the sheet of fabric and finally with another sheet of rubber not containing the volatile ingredients.

The ends of the cylinder are then joined to form an annulus which is placed in a suitable mold so constructed as to be gas tight and sufficiently strong to withstand the pressure generated during the subsequent treatment. The mold is placed in a vulcanizing drum and subjected to heat by means of steam surrounding the mold. Primarily steam under low pressure is admitted and this pressure is gradually increased in the manner described in the Huebner patents, until vulcanization is completed, when the mold is removed and permitted to cool.

During the initial steps of heating which precede the vulcanization, the volatile ingredients of the rubber compound, consisting of turpentine and ammonium carbonate, are transformed into gas globules which expand and produce cells, the prolonged continuation of the heat at a point below that required for vulcanization giving the evenly distributed volatile matter time to become fully expanded before the rubber compound sets.

By reason of the fact that no opportunity is given for the evaporation of the volatile ingredient between the time of incorporating it in the rubber compound and the formation of the cylindrical body, such cylindrical body is of uniform composition throughout except that portion which is next to the interior of the fabric and that portion which is outside of the fabric.

The outer casing 13 and the rim 14 may be of the usual and standard forms and the inner tire or filler of cellular rubber with the rubber coated fabric covering vulcanized thereto is of the exact size required to fill the casing when secured to the rim and to maintain the casing in a condition equivalent to the proper inflation of an inner tube. The solid rubber lining for the fabric covering forms a strong binder between the fabric and the cellular rubber core while the solid rubber coating on the outside of the fabric forms a smooth frictionless surface to fit the fabric coated wall of the outer casing.

What I claim as new and desire to secure by Letters Patent is:

In a vehicle tire an outer casing, a tire filler fitting therein and comprising a sponge rubber core surrounded by a rubber coated fabric covering, the rubber next to the fabric coating on the inside and outside thereof being solid and giving the filler a smooth surface to avoid friction with the outside casing.

In testimony whereof I affix my signature.

EMIL GRATT.